Sept. 5, 1939.                    C. I. HANEY                        2,171,652
                           MEANS FOR TREATING SOLIDS
                           Filed Sept. 23, 1937          2 Sheets-Sheet 1

Fig.1.

INVENTOR
Clifford I. Haney
BY
ATTORNEYS

Sept. 5, 1939.                    C. I. HANEY                    2,171,652
                            MEANS FOR TREATING SOLIDS
                    Filed Sept. 23, 1937          2 Sheets-Sheet 2
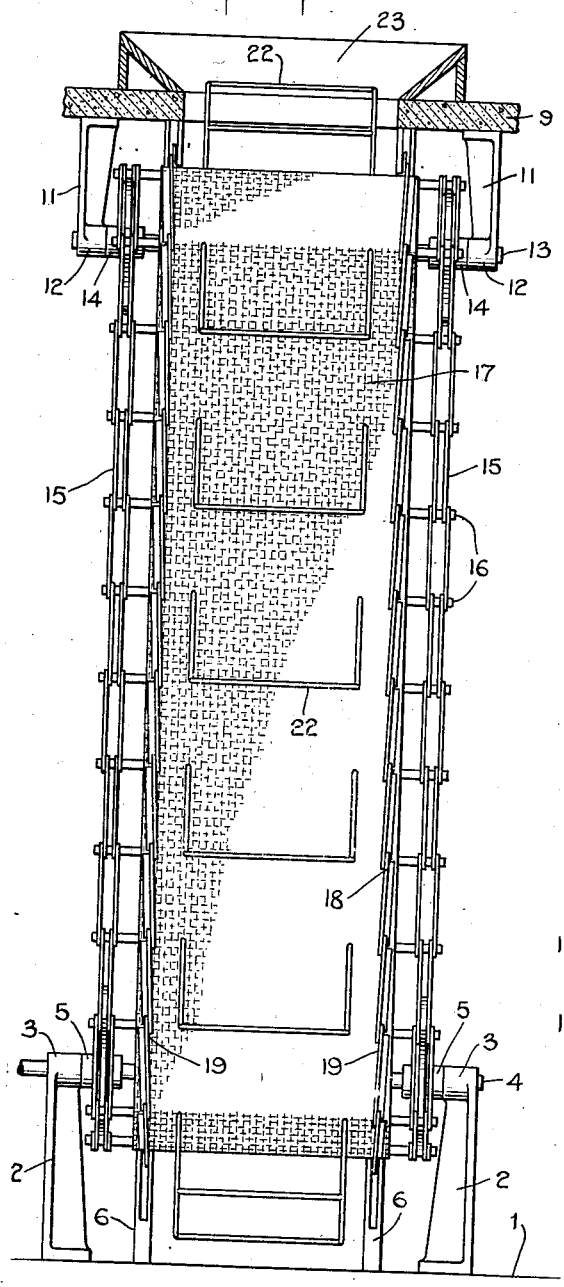
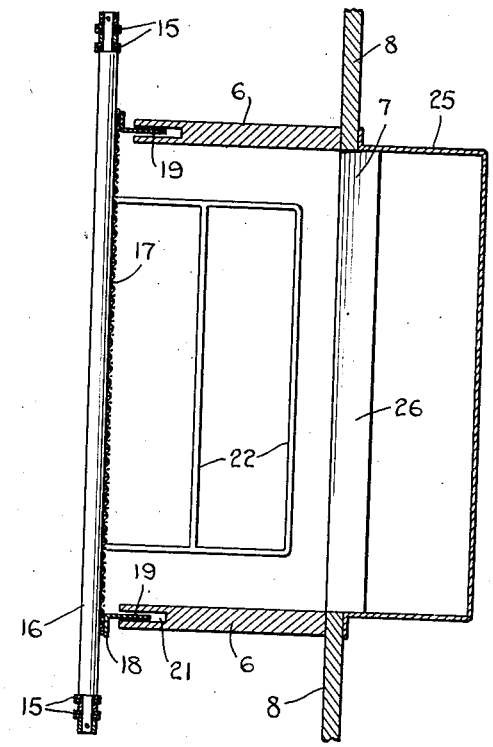
INVENTOR
Clifford I. Haney
ATTORNEYS Patented Sept. 5, 1939

2,171,652

UNITED STATES PATENT OFFICE 2,171,652

MEANS FOR TREATING SOLIDS

Clifford I. Haney, Drummondville, Quebec, Canada, assignor to Celanese Corporation of America, a corporation of Delaware Application September 23, 1937, Serial No. 165,277

2 Claims. (Cl. 34—34)

This invention relates to a means for drying solid materials in a continuous manner.

An object of the invention is to provide means for continuously drying solid materials in the form of particles of different sizes which have been treated with a liquid. A further object of my invention is to provide means for continuously drying cellulose acetate, which has been precipitated, stabilized and washed, in such a manner that the readiness in which it is capable of being dissolved in the solvent is at a maximum. Other objects of this invention will appear from the following detailed description and drawings.

Cellulose acetate precipitated from its solution in acetic acid often vary greatly in particle size even in the same charge and the precipitated particles are in a great variety of forms. The particle sizes often run from the dimensions of dust to coarse pieces 5 or 6 inches long. It is, therefore, quite difficult to provide means for drying this material in a continuous manner, especially as the rate of travel or diffusion of water or moisture from the cellulose acetate is very slow. Due to the difference in size of the particles a strong current of drying air blows the finer particles away forming a dust hazard and great loss of material. If a small current of air is employed the larger particles are not dried and to dry them would require a machine of such dimensions as to be impractical.

I have found that cellulose acetate may be dried in a continuous manner by removing a part of the water therefrom and then moving the same through a current of heated air while holding it confined in a given space. Means are provided to prevent a packing of the cellulose acetate and to prevent the air from forming channels in the cellulose acetate such that the entire quantity of cellulose acetate is contacted by a uniform amount of air. This I accomplish by such a device as will be hereinafter described.

In the precipitation, stabilizing and washing of cellulose acetate, many expedients have been employed to produce the cellulose acetate in a condition such that it will be capable of being readily dissolved by solvents. For this reason the cellulose acetate is produced in a relatively fluffy condition and therefore the drying method must be such that it will not have a tendency to destroy this property. The method and apparatus of this invention not only retains this property but enhances it.

In accordance with my invention, I dry solid materials, such as an organic derivative of cellulose, by mechanically removing a part of the liquid and thereafter moving the organic derivative of cellulose through a current of a drying gas while holding it confined in a given space without packing it or allowing channels to form therein due to the current of drying gases. Also, in accordance with my invention, I construct a device for carrying out the above method in a continuous and expeditious manner.

While this invention is of particular importance in the treatment of cellulose acetate or other cellulose esters which have been treated with liquids such as stabilizing baths, it is applicable to the treatment of other materials such as cellulose acetate, cellulose ethers and, in fact, any other solid material that is in the form of particles and which may be altered in physical or chemical properties by other methods of drying.

The solid materials may come to the dryer after they have been given a liquid treatment, as a washing with water, or from a treatment with a liquid which has a chemical or physical action on the solid particles, that is treatments with stabilizing agents, dyes, etc., or with chemical liquids or aqueous solutions of materials. After treatment with the liquids the solids may be dried, in accordance with this invention, down to or below that amount that they will normally retain from the atmosphere.

For illustration of one mode of carrying out this invention, reference is had to the accompanying drawings which show a form of apparatus for removing liquids from cellulose acetate, first by mechanical means and then by a current of air.

Figure 1 is a cross-sectional view of a dryer showing the position of the solid material in the course of the drying operation, Figure 2 is a front elevational view of a dryer constructed in accordance with this invention, and Figure 3 is a sectional view, taken on line 3—3, of Figure 1.

Referring to the drawings, there is shown a floor, base or other support 1 upon which is mounted brackets 2, the upper ends of which terminate in a bearing 3. A shaft 4 is journalled in bearings 3 and carries a pair of sprocket wheels 5. Also supported on the base 1 is an enclosure formed by side walls 6 and a back wall 7, the back wall 7 having extending portions 8.

From another level 9, which may be an upper floor or a platform, are two brackets 11 which terminate in bearings 12. In the bearings 12 is journalled a shaft 13. Mounted on the shaft 13 are a pair of sprocket wheels 14. About the pairs of sprocket wheels 14 and 15 is a link belt formed of side links 15 connected by cross bars 16. Mounted on the cross bars 16 is a wire apron 17. Mounted on the wire apron are short lengths of angle iron 18 so arranged that one flange 19 thereof stands outwardly from the wire apron and overlaps the angle iron preceding it in such a manner that pairs of the angle irons form solid sides on the edge of the apron. The side walls 6 of the enclosure are slotted as at 21 such that the flange 19 on the conveyor forms a seal preventing any material from coming out of the sides of the enclosure. Mounted upon the conveyor apron at spaced intervals, say every other link of the conveyor, are mounted drag hooks 22.

Above the support 9 is mounted a hopper 23 adapted to receive mechanically dried solids and direct them into the enclosure formed by the conveyor, the side walls 6 and the back wall 7. The mechanical dryer may be a squeeze-dryer wherein the solids are subjected to pressure between two or more matched serrated rolls which exert a crushing or tearing action on the material while simultaneously squeezing out the liquids, or it may be a centrifugal dryer, etc. To the rear of the back wall 7 is a duct 25. This duct being rectangular in section is reduced in depth from the bottom to the top. The back wall 7 is formed into a system of louvres 26 formed integral with the above mentioned ducting. The louvres are of substantial thickness and are sloped in the direction of the travel of the conveyor such that the material will not have a tendency to wedge into same. Means 27, such as a conduit running from a hot air heater or other source of drying gas is provided for furnishing the duct 25 with a supply of drying gas under pressure. The drying gas may be heated air or inert gases such as nitrogen, carbon dioxide, etc.

For discharging the drying apparatus there may be provided an endless conveyor 28 set into the base 1 in such a position that the material leaving the dryer falls upon the same.

Obviously many modifications may be made in the device from that shown without departing from the spirit of my invention. For instance, in place of blowing the drying gas through the material into the room a system of ducts may be provided on the opposite side of the wire apron from the enclosure and on the interior of the loop formed by the apron for directing the drying gas back to the heater or for recirculation through another section of the same device or to another device. Also a duct may be provided on the bottom half or any bottom part for receiving the drying gases as blown through the material and return the same to the ducting 25 such that these drying gases would first pass through the driest part of the solid material and then through the wettest part of the material with fresh drying gas coming through the driest part of the material. As another modification two such dryers may be placed front to front utilizing the same feed hopper and discharge conveyor.

The drying device may be of any suitable height. However, it is sufficient for the purpose of drying cellulose acetate if the drying device is about 14 feet high. The louvres 26 should be spaced approximately 2 feet from the top or bottom of the side walls 6 such that there will be two feet of material acting as a seal to prevent the drying gas from passing up or down the drying device instead of across the same.

Such materials as cellulose acetate have previously been dried in a very shallow pan, say of about 3 inches in depth, because this material has a tendency to channel if strong currents of air are employed and employing less strong currents of air there is a limit to the thickness of the bed of cellulose acetate that can be efficiently penetrated. In the device as shown in the drawings the drag hooks being formed of relatively small bars in cross section as compared with the cross section of the enclosure they tend to stir up as well as move the cellulose acetate onward preventing channeling and breaking up any tendency of the cellulose acetate to bridge. By this means beds of cellulose acetate from 10 to 30 inches thick may be successfully dried. Thus, there is provided, by a device as shown in the drawings, a great saving of space based upon the output of cellulose acetate.

As a means of describing the operation of the device, the same will be described with particular reference to the drying of cellulose acetate coming from an aqueous stabilizing bath. The cellulose acetate 29 is drained of the excess liquor employed in the stabilizing bath and deposited upon the feed platform 31 of the mechanical drying device. The mechanical drying device as disclosed in this case is a pair of squeeze rolls 24. The cellulose acetate enters the squeeze rolls with close to 100% of moisture and upon leaving the squeeze rolls contains 30 to 50% of moisture and is in a shredded, non-compact condition. The material from the squeeze rolls passes into the hopper 23 and into the dryer enclosure formed by the wire apron 17, the side and back walls 6 and 7. As the cellulose acetate travels downward a current of heated air, say at a temperature of 110° C., is blown through the cellulose acetate by means of the louvres which distributes the current of air fairly evenly through the cellulose acetate and the wire apron on the conveyor allows the spent air to escape into the room. Any tendency for the cellulose acetate to bridge, pack or channel is prevented by the hooks 22 which tend to pass through the cellulose acetate at a slightly greater speed than the movement of the stream of cellulose acetate. The incoming cellulose acetate from the squeeze rolls forms a plug in the upper end preventing escape of the air therethrough while the larger amount of dry cellulose acetate at the bottom of the dryer prevents the air from being forced out through the bottom end. Thus the air is directed practically straight across the moving cellulose acetate. The cellulose acetate may be dried down to 18% moisture or lower depending upon the speed of travel of the dryer. By running the drying device at slow speed the cellulose acetate may be dried down to 3% moisture content which is normally below that which it will regain from the atmosphere.

It is to be understood that the foregoing detailed description is merely given by way of illustration and that many variations may be made therein without departing from the spirit of my invention.

Having described my invention, what I desire to secure by Letters Patent is:

1. Apparatus for drying cellulose acetate or like material in a continuous manner, comprising means for mechanically extracting a part of the wetting liquid from the material, a substantially vertical drying chamber arranged to receive the partly dried material and bounded on at least one side by a wall comprising a series of louvres and on one side opposite said wall by a movable wire apron, and means for promoting internal motion in the body of the material.

2. Apparatus for drying cellulose acetate or like material in a continuous manner, comprising squeeze rolls for mechanically extracting a part of the wetting liquid, a hopper to receive the partly dried material therefrom, a substantially vertical drying chamber communicating with said hopper and bounded on at least one side by a wall comprising a series of louvres, and on one side opposite said wall by a movable wire apron, a duct integral with said louvres adapted to convey drying atmosphere thereto and drag hooks mounted on said wire apron.

CLIFFORD I. HANEY.